(12) United States Patent
Morilhat et al.

(10) Patent No.: US 8,398,173 B2
(45) Date of Patent: Mar. 19, 2013

(54) VEHICULAR SEAT HEADREST AND METHOD

(75) Inventors: Philippe Morilhat, Fegersheim (FR); Francois Zaepfel, Eschau (FR); Paul Quirin, Illkirch (FR); Eugenie Geisinger, Drulingen (FR); Yves Olland, Souffelweyersheim (FR); Nicolas Mehl, Kesseldorf (FR)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 11/909,990

(22) PCT Filed: Mar. 28, 2006

(86) PCT No.: PCT/EP2006/061111
§ 371 (c)(1),
(2), (4) Date: Dec. 6, 2007

(87) PCT Pub. No.: WO2006/103242
PCT Pub. Date: Oct. 5, 2006

(65) Prior Publication Data
US 2008/0211286 A1    Sep. 4, 2008

(30) Foreign Application Priority Data
Apr. 1, 2005   (DE) .......................... 10 2005 015 292

(51) Int. Cl.
*B60N 2/48* (2006.01)
(52) U.S. Cl. ........................................ 297/391; 297/220
(58) Field of Classification Search .................. 297/408, 297/391, 220
See application file for complete search history.

(56) References Cited

U.S. PATENT DOCUMENTS

| | | | | |
|---|---|---|---|---|
| 4,738,809 A | * | 4/1988 | Storch | 264/46.6 |
| 4,891,081 A | * | 1/1990 | Takahashi et al. | 156/78 |
| 5,061,419 A | * | 10/1991 | Kouda et al. | 264/46.6 |
| 5,135,593 A | * | 8/1992 | Quirin | 156/78 |
| 5,261,726 A | * | 11/1993 | Yanagishita | 297/408 |
| 5,452,939 A | * | 9/1995 | Kupisz et al. | 297/391 |
| 5,478,136 A | * | 12/1995 | Takeuchi et al. | 297/391 |

(Continued)

FOREIGN PATENT DOCUMENTS

| | | |
|---|---|---|
| DE | 2405774 | 8/1975 |
| DE | 2727987 | 1/1979 |

(Continued)

OTHER PUBLICATIONS

Patent Abstracts of Japan, Publication No. 07-039660, Published Feb. 10, 1995 to Sugimoto Yoshihiko, entitled "Foamed Article Integrated with Surface Skin" (translation included). Patent Abstracts of Japan, vol. 1995, No. 05, Jun. 30, 1995 (not available).

*Primary Examiner* — Peter R. Brown
(74) *Attorney, Agent, or Firm* — Dickinson Wright PLLC (57) ABSTRACT

The invention relates to a headrest for a vehicle, a method for producing a headrest, and a vehicle seat comprising a headrest. The headrest is provided with a body (2) and a holding element (3). A filling material (23) is provided between a connection part (22), used to connect the holding element (3) to the headrest body (2), and a cover (21). The connection part (22) and the cover (21) define an essentially tight space in relation to the filling material (23) when the filling material (23) is in the essentially liquid processing state thereof.

4 Claims, 6 Drawing Sheets

U.S. PATENT DOCUMENTS

| | | | |
|---|---|---|---|
| 5,681,087 A * | 10/1997 | Yamano et al. | 297/391 |
| 5,681,088 A * | 10/1997 | Takei | 297/408 |
| 5,730,917 A * | 3/1998 | Ishikawa et al. | 264/46.5 |
| 5,855,831 A * | 1/1999 | Takei | 264/46.6 |
| 5,967,612 A * | 10/1999 | Takei | 297/391 |
| 5,984,414 A * | 11/1999 | Adachi et al. | 297/391 |
| 6,068,338 A * | 5/2000 | Takei et al. | 297/391 |
| 6,120,100 A * | 9/2000 | Palazzolo et al. | 297/391 |
| 6,149,233 A | 11/2000 | Takei et al. | |
| 6,183,045 B1 * | 2/2001 | Marfilius et al. | 297/391 |
| 6,200,505 B1 * | 3/2001 | Zibert | 264/46.5 |
| 6,200,506 B1 * | 3/2001 | Takei | 264/46.6 |
| 6,419,322 B2 * | 7/2002 | Nakane et al. | 297/408 |
| 6,499,805 B1 * | 12/2002 | Watadani | 297/408 |
| 6,505,570 B1 * | 1/2003 | Sakamoto et al. | 112/470.27 |
| 6,527,344 B2 * | 3/2003 | Takei | 297/391 |
| 6,634,715 B2 * | 10/2003 | Nakane et al. | 297/408 |
| 6,695,376 B1 | 2/2004 | Hirano | |
| 6,863,850 B2 * | 3/2005 | Brown et al. | 264/46.8 |
| 7,028,973 B1 * | 4/2006 | Hibino et al. | 249/95 |
| 7,338,129 B2 * | 3/2008 | Tabata | 297/391 |
| 2001/0004167 A1 * | 6/2001 | Takeda et al. | 297/408 |
| 2001/0028190 A1 * | 10/2001 | Nakane et al. | 297/408 |
| 2006/0071528 A1 * | 4/2006 | Foelster et al. | 297/391 |
| 2007/0132299 A1 * | 6/2007 | Fernandez De La Pradilla et al. | 297/408 |
| 2007/0176479 A1 * | 8/2007 | Tabata | 297/391 |
| 2008/0265645 A1 * | 10/2008 | Kasuya | 297/391 |
| 2009/0021068 A1 * | 1/2009 | Yamane et al. | 297/408 |

FOREIGN PATENT DOCUMENTS

| | | |
|---|---|---|
| DE | 39 30 135 | 9/1990 |
| DE | 68902955 T2 | 3/1993 |
| ES | 2192116 | 9/2003 |
| JP | 6143307 A | 5/1994 |
| JP | 7 039660 | 2/1995 |
| JP | 8141232 A | 6/1996 |
| JP | 2003339472 A | 12/2003 |

* cited by examiner

VEHICULAR SEAT HEADREST AND METHOD

CROSS REFERENCE TO RELATED APPLICATIONS

None.

BACKGROUND OF THE INVENTION

1. Field of the Invention

The invention relates to a headrest for a motor vehicle.

2. Related Art

Such headrests are generally known. In particular with headrests for vehicles, it is already known that, between an outer cover and an inner connection part for attaching the headrest to a headrest holding element, in particular in the form of headrest rods, a filling material is arranged in the form of a foam which provides the required stability, on the one hand, for the headrest and which, on the other hand, may be easily shaped and has a low weight.

In known headrests it is provided, for example, that a preformed foam body is used to fill the headrest body. For assembling and shaping the headrest and/or individual parts thereof, the foam body requires a relatively large number of production and processing steps, so that such a production method for headrests is very complicated and costly.

A method for producing seats is known from DE 689 02 955 T2, in which foam padding is produced by an "in-situ foaming method" and/or PIP (pour-in-place) method. Advantageously, with this method the production of the foam padding may firstly be carried out, on the one hand, more rapidly and, on the other hand, that the production may be carried out with fewer steps and thus more cost-effectively.

Directly applying the PIP method to headrests, however, leads to problems due to the specific conditions of such headrests, in particular if the headrest body is intended to be provided to be movable, for example tiltable, relative to the headrest holding element.

The object of the invention, therefore, is to provide a headrest for a vehicle which may be produced easily, rapidly and at relatively low cost and which, however, has a maximum degree of attractiveness and functionality and, in particular, avoids the drawbacks of the prior art.

SUMMARY OF THE INVENTION

The object is achieved according to the invention by a headrest for a vehicle, in particular for a motor vehicle, the headrest having a headrest body and a headrest holding element, a cover being at least partially provided on the outer face of the headrest body, a connection part being provided inside the headrest body for connecting the headrest holding element to the headrest body, a filling material, in particular a foam, being arranged between the connection part and the cover, the filling material being provided in substantially liquid form in its processing state, and the connection part and the cover defining a substantially sealed space relative to the filling material in its processing state. It is, therefore, possible also to use PIP foaming methods, which are known in principle, for headrests, such headrests having the ability to adjust the inclination of the headrest body relative to the headrest holding element, similar to headrests which are conventionally produced in a complex manner. According to the invention, this is achieved by sufficient sealing of the connection part relative to the inside of the connection part receiving the headrest holding element, on the one hand, and sufficient sealing between the cover and the connection part, on the other hand, relative to the filling material in its processing state.

In the sense of the invention, by the term "processing state" of the filling material is denoted the state of the filling material in which the filling material is found when used in the production process. The processing state of the filling material is thus substantially characterized by a specific viscosity of the liquid representing the filling material in its processing state. The foaming time and/or the curing time of the filling material are considered as further parameters of the processing state with regard to the sealing of the space.

In the sense of the present invention, the term "sealed space" is understood to be that the filling material in its processing state, i.e. before its cured and/or foamed final state, which it has during the life of the headrest, does not escape to any considerable degree from the sealed space, in particular into the inside of the connection part and/or between the connection part and the cover.

According to one embodiment of the invention, the cover may be arranged substantially on the entire outer face of the headrest body, in particular also in the region of the outlet of the headrest holding element from the headrest body. As a result, it is possible to provide the entire headrest and/or in particular the headrest body with a particularly uniform and thus attractive exterior, by the headrest body, in particular also in its lower region where the outlet of the headrest holding element from the headrest body is located, being surrounded almost completely by the cover. Moreover, as a result, the headrest according to the invention may also be designed more safely, as for example an additional covering part is avoided in the region of the outlet of the headrest holding element from the headrest body. It is possible, for example, for such a covering part to be detached from the headrest in crash situations, and thus endanger passengers of the vehicle or, however, it is possible for such a covering part to shatter and thus also represent a danger to passengers of the vehicle.

It is further possible that the connection part has an internal volume for receiving the headrest holding element and that, relative to the filling material in its processing state, the part of the connection part coming into contact with the filling material is sealingly provided relative to the internal volume. Moreover, the cover may extend at least partially in the region of one edge of the connection part located in the region of the outlet of the headrest holding element, the edge being provided such that the cover may sealingly bear against the edge. As a result, as a whole it is possible by simple means to ensure both a simple, rapid and cost-effective producibility of the headrest according to the invention and, on the other hand, to accept no compromises as regards the visual design of the headrest or its functional value, namely with regard to its ability to be adjusted for comfortable positioning.

A further subject of the present invention is a method for producing a headrest according to the invention, the headrest holding element and the connection part being arranged inside the cover and subsequently the filling material being introduced in its processing state into the space between the cover and the connection part and adopting its final state there.

The final state is defined in the sense of this invention as that state of the filling material which the filling material has after its shaping and/or in particular after its foaming, i.e. during the entire life of the headrest. The final state of the filling material is substantially characterized by the foam being fully polymerized.

The advantage of the method according to the invention is that it may be carried out particularly easily, rapidly and cost-effectively, so that the headrest produced thereby may also be produced, in particular, very cost-effectively and very rapidly.

It is advantageous that, at least whilst the filling material introduced into the headrest is in its processing state, the cover is pressed by means of a tool against the edge of the connection part. As a result, it is possible by simple means to create a seal of the space which is intended to be filled with the filling material and yet to enclose the headrest completely with the cover.

A further subject of the present invention is a vehicle seat with a headrest according to the invention, in which the headrest is provided to be adjustable relative to the seat, substantially in a main extension direction of the headrest holding element. As a result, it is possible that the headrest may be adjusted in four adjusting directions, namely both upwards and downwards in the main extension direction of the headrest holding element and also may be tilted to the front and/or to the rear. Such a fourfold adjustable headrest particularly meets the comfort requirements of users of current motor vehicles.

BRIEF DESCRIPTION OF THE DRAWINGS

The invention is described in more detail hereinafter with reference to embodiments shown in the drawings, in which.

DETAILED DESCRIPTION OF THE PREFERRED EMBODIMENT

Figure 1:
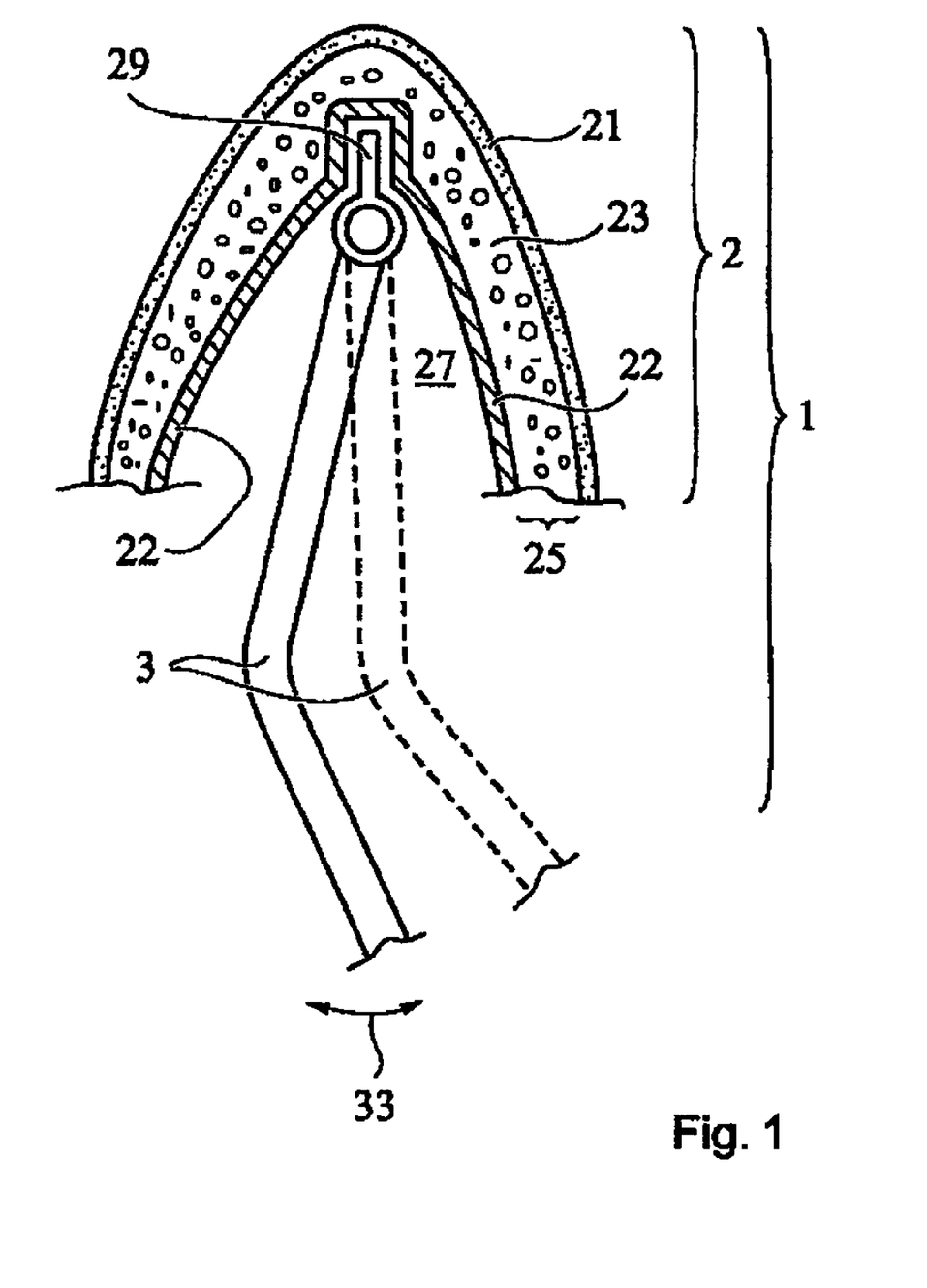
FIG. 1 shows a principal view of a headrest according to the invention, in which the headrest body is provided to be tiltable relative to a headrest holding element.

A headrest 1 is shown in FIG. 1 with a headrest body 2 and a headrest holding element 3. The headrest body 2 and the headrest holding element 3 according to the invention are movably, in particular tiltably, connected together, which is indicated in FIG. 1 by the double arrow 33. In a headrest 1 according to the invention, the headrest body 2 comprises, in particular, a cover 21, a connection part 22 as well as a filling material 23 which is provided, in particular, as a foam material and/or is shown in its final state as a foam material. In a processing state of the filling material 23, the filling material is provided in substantially liquid form and is filled into a space 25 between the cover 21 and the connection part 22. In this connection, according to the invention the space 25 is provided to be sealed both against an emergence of the filling material 23 in its processing state into the internal volume 27 of the connection part 22 and also between the cover 21 and the connection part 22. A spring 29 and/or clip 29 serves for the mechanical connection and the implementation of the tiltability between the headrest holding element 3 and the headrest body 2, in particular the connection part 22.

Figure 2:
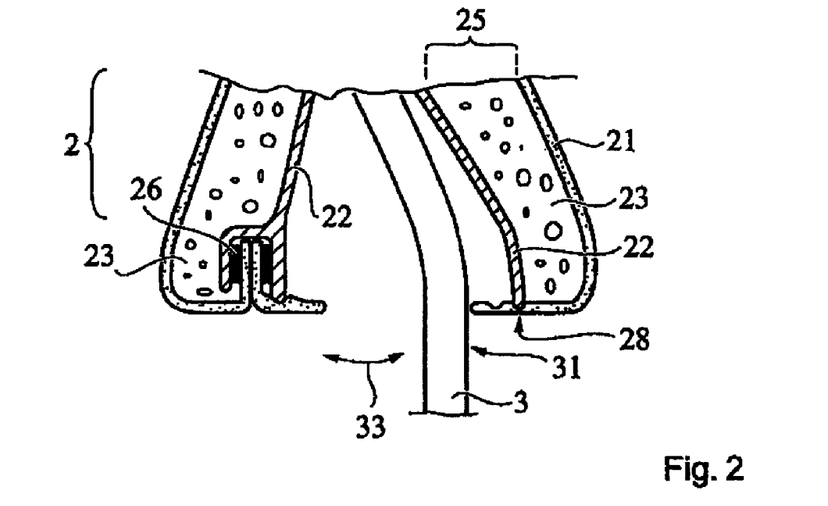
FIG. 2 shows a first embodiment of the lower part of a headrest according to the invention.

FIG. 2 shows the lower part of a first embodiment of the headrest body 2. The space 25 is, in turn, filled up with the filling material 23 between the cover 21 and the connection part 22, the headrest holding element 3 as well as its tiltability (double arrow 33) being also indicated in FIG. 2. The connection part 22 comprises a fastening means 26 for the cover 21, visible in the left-hand part of FIG. 2. In the right-hand part of FIG. 2, the cover 21 merely bears against a specific profile of the connection part 22, in particular against one edge 28 of the connection part 22, and/or is pressed by means of a tool, not shown, during the production process, such that in the region of the edge 28 the filling material 23 in its processing state is not able to escape or at least not to any considerable degree. The space 25 is, therefore, also sealed at this point. The edge 28 is designed such that it has a relatively small bearing surface towards the cover 21, so that merely a small force of a tool, not shown in the figures, is sufficient during the production of the headrest according to the invention, in order to provide sealed behavior at the position of the edge 28 on the cover 21 relative to the filling material 23 in its processing state.

Figure 3:
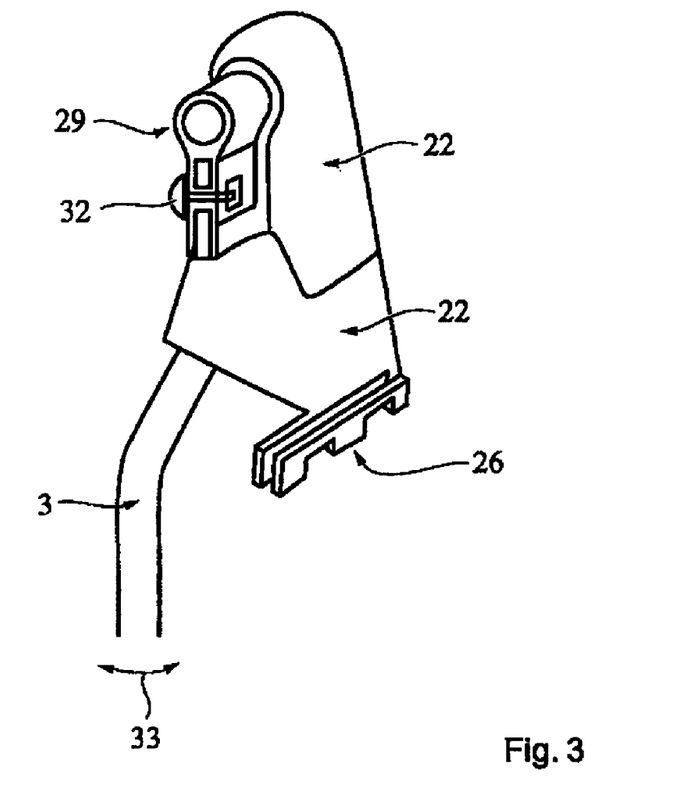
FIG. 3 shows a partially cut-away view of the headrest body of the first embodiment.

In FIG. 3, the first embodiment of the headrest body 2 according to the invention is shown in partially cut-away form, i.e. without the cover 21. In this case, the connection part 22, the fastening means 26 as well as the clip 29 and/or the spring 29 are visible. Moreover, a fastening element 32, in particular in the form of a screw, is shown for fastening the connection part 22 to the clip 29 and/or the spring 29.

Figure 4A:
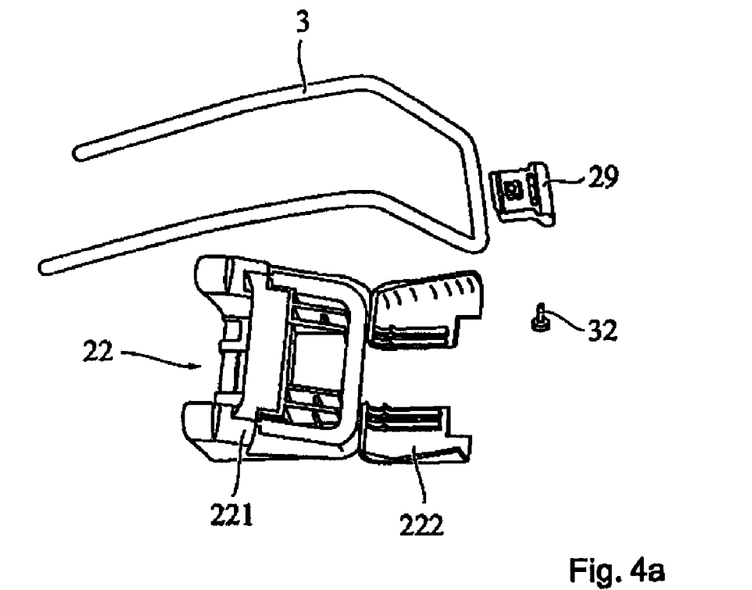
FIGS. 4a-4c show the essential elements of the headrest in the inside of the headrest body in the first embodiment of the headrest according to the invention.
Figure 4B:
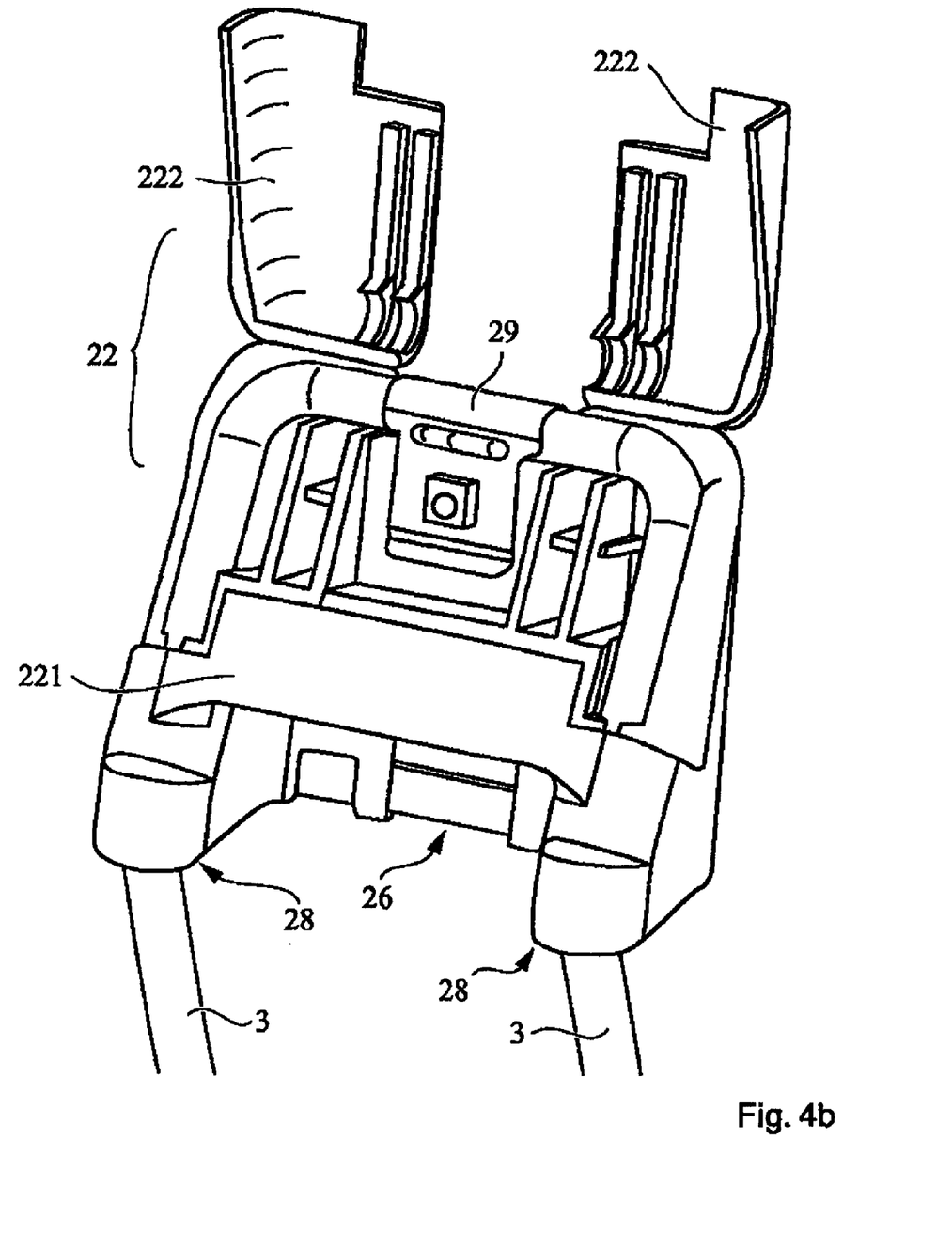
Figure 4C:
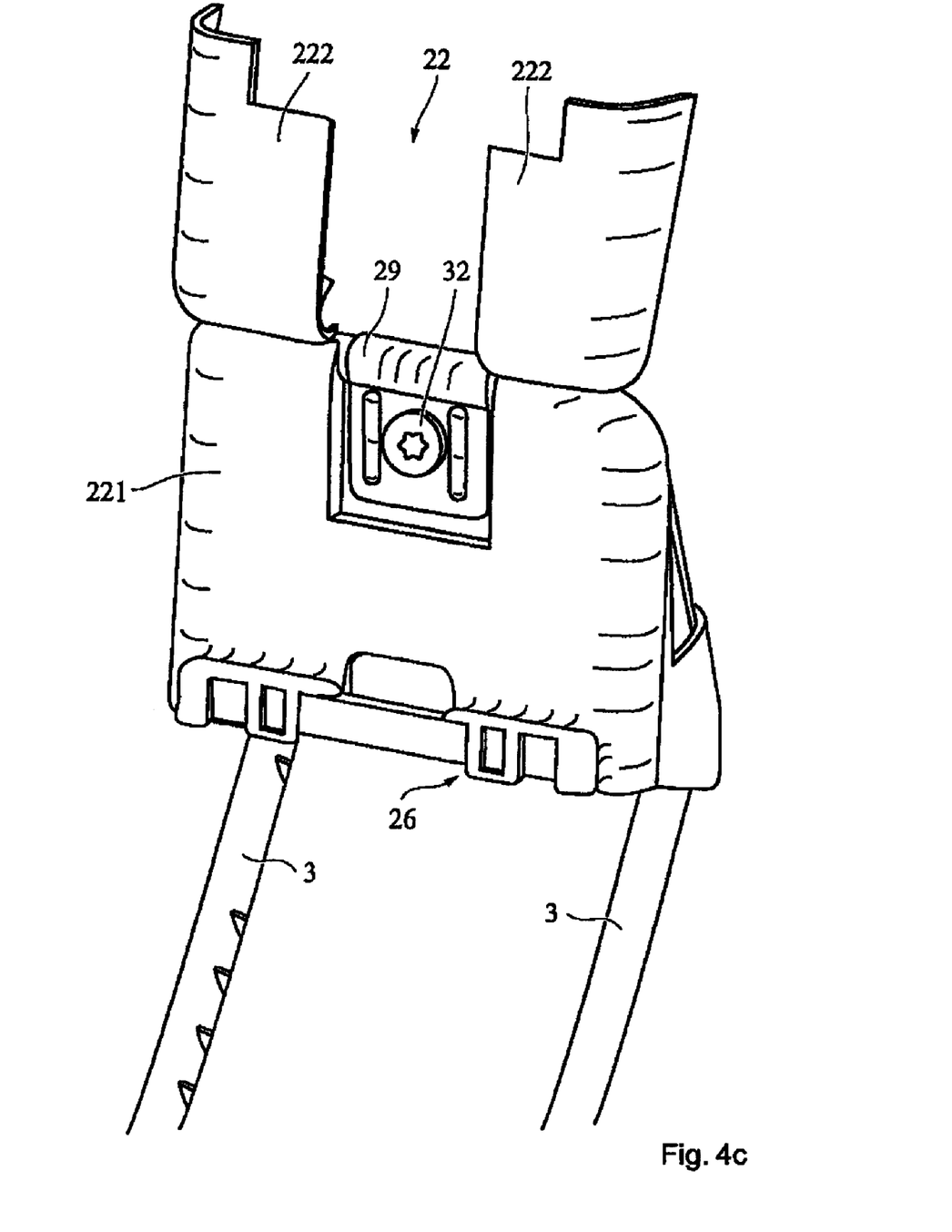

The individual parts inside the cover 21 of the headrest 1 are shown in FIGS. 4a-4c. FIG. 4a shows the headrest holding element 3 which also partially projects from the headrest body 2, (see FIGS. 1 to 3), the connection part 22, the spring 29 and/or the clip 29 as well as the fastening element 32 in the disassembled state. FIGS. 4b and 4c show the headrest holding element 3, the connection part 22, the spring 29 and/or the clip 29 as well as the fastening element 32 in the assembled state. The connection part 22 is shown in FIGS. 4a-c in the folded-up form, namely with a main part 221 and a subsidiary part 222 which may be folded onto the main part 221. For making the headrest 1 according to the invention, the headrest holding element 3 is inserted into the connection part 22 and subsequently the subsidiary part 222 is folded down onto the main part 221. In this case, the connection part 22 is designed such that when the subsidiary part 222 is closed (folded down), a shape which is sealed relative to an internal volume 27 of the connection part 22, not shown in FIGS. 4a-4c, may be produced relative to the filling material 23 in its processing state. As a result, according to the invention, with the production method of the headrest 1 according to the invention (PIP method) the filling material 23 is not able to enter the internal volume 27 of the connection part 22 or at least not to any considerable degree, which could lead to preventing the tiltability of the headrest holding element 3 relative to the connection part 22 and thus relative to the headrest body 2.

Figure 5:
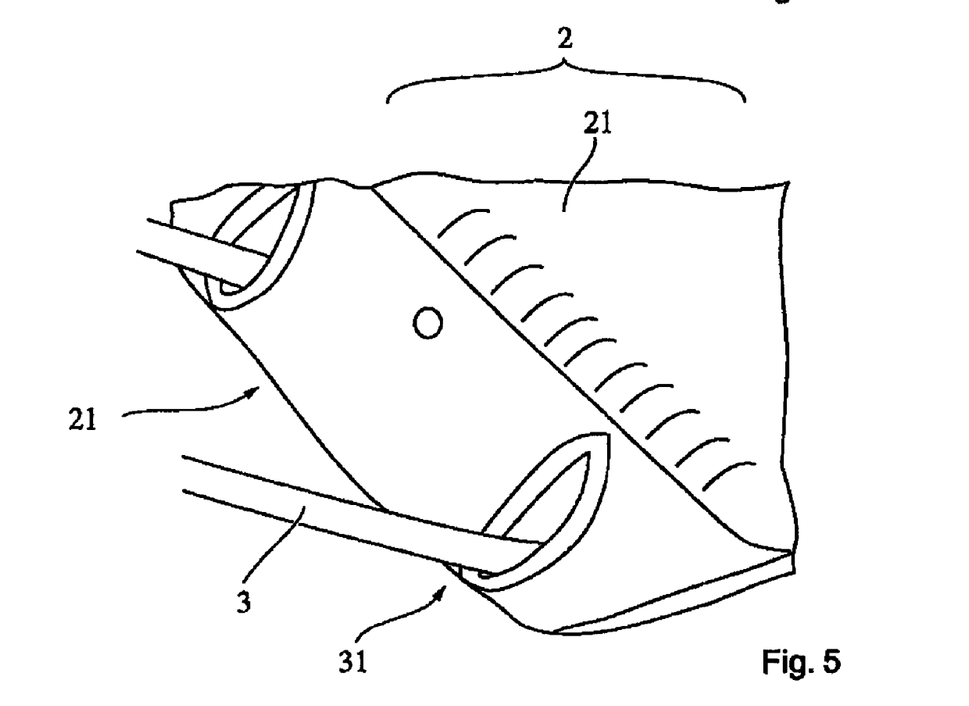
FIG. 5 shows an external view of the finished headrest in the first embodiment of the headrest according to the invention and FIG. 6 shows the lower part of the headrest body of a second embodiment of the headrest according to the invention.

In FIG. 5 the headrest body 2 and the headrest holding element 3 are shown in their finished form, the cover 21 being visible at the outlet 31 of the headrest holding element 3 from the headrest body 2. As a result, the headrest 1 according to the invention gains a particularly attractive exterior.

According to the invention, in the known manner, the term "cover 21" also allows for a lamination and/or a laminate attached to the inside of the cover 21, so that the filling material 23 does not penetrate the fabric of the cover 21. According to the invention, filling material 23, in particular in polyurethane foam, is provided, other materials, however, also being suitable, in particular those which are conventionally used in the PIP method. To this end, reference is made to the publication DE 689 02 955 T2 and this is incorporated as a reference and part of this disclosure.

In such a headrest 1 according to the invention, the requirements of the ECE 17 and FMVSS 202 standards are fulfilled.

Figure 6:
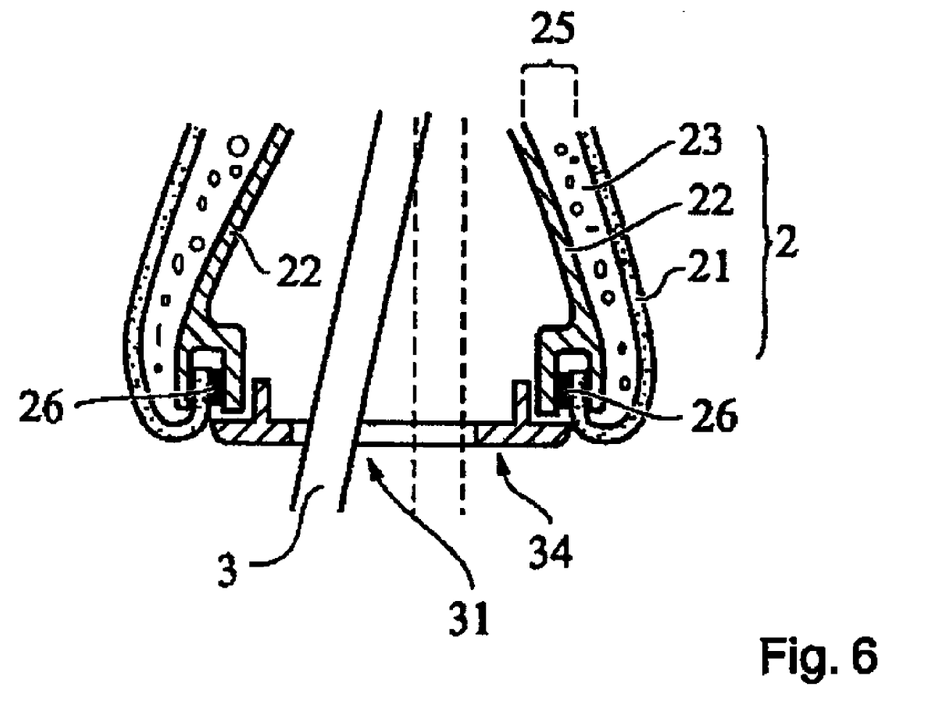

In FIG. 6, the lower part of a headrest body 2 is shown according to a second embodiment of the headrest 1, a covering element 34, in particular made of plastics material and/or synthetic material, being provided in the region of the outlet 31 of the headrest holding element 3 and a fastening means 26 being provided on both sides of the connection part 22 for fixing the cover 21.

The cover 21 is connected to the connection part 22 and namely by means of the fastening means 26 along the entire lower periphery of the connection part 22, the connection part 22 having a substantially bell-shaped form.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

LIST OF REFERENCE NUMERALS

1 Headrest
2 Headrest body
3 Headrest holding element
21 Cover
22 Connection part
23 Filling material
25 Space
26 Fastening means
27 Internal volume
28 Edges
29 Spring and/or clip
31 Outlet of the headrest holding element
32 Fastening element
33 Double arrow
34 Covering element
221 Main part
222 Subsidiary part

The invention claimed is:

1. A headrest for a vehicle, in particular a motor vehicle, comprising:
   a headrest body and a headrest holding element,
   a cover arranged substantially on the entire outer face of the headrest body and also in the region of an outlet of the headrest holding element from the headrest body,
   a connection part being provided inside the headrest body and at least partially within the confines of the cover for connecting the headrest holding element to the headrest body,
   the cover extends at least partially in the region of one edge of the connection part located in the region of the outlet of the headrest holding element, the edge being provided with a small bearing surface such that the cover may sealingly bear against the edge and wherein the cover includes at least one groove and wherein the edge of the connection part is received in the at least one groove,
   a foam filling material being arranged between the connection part and the cover, the filling material being provided in substantially liquid form in its processing state,
   and relative to the filling material in its processing state, the connection part and the cover define a substantially sealed space.

2. The headrest as claimed in claim 1 further characterized in that the connection part has an internal volume for receiving the headrest holding element and in that, relative to the filling material in its processing state, the part of the connection part coming into contact with the filling material is sealingly provided relative to the internal volume.

3. The headrest as claimed in claim 1 wherein the cover is of one-piece of material.

4. A method for producing a headrest, said method comprising the steps of:
   providing a headrest body having an outer face and a headrest holding element,
   at least partially covering the outer face of the headrest body with a cover having at least one groove,
   connecting the headrest holding element to the headrest body with an internal connecting part,
   arranging the headrest holding element and the connection part inside the cover,
   introducing the filling material in its processing state into the space between the cover and the connection part and at least whilst the filling material introduced into the headrest is in its processing state, the cover is pressed by means of a tool against the edge of the connection part such that the edge of the connection part is received in the at least one groove of the bearing surface of the cover.

* * * * *